(12) United States Patent
Huang

(10) Patent No.: US 8,820,543 B2
(45) Date of Patent: Sep. 2, 2014

(54) APPARATUS FOR DISPLAYING A BICYCLE ON A POST

(76) Inventor: Han-Ching Huang, Taichung (TW)

( * ) Notice: Subject to any disclaimer, the term of this patent is extended or adjusted under 35 U.S.C. 154(b) by 773 days.

(21) Appl. No.: 13/007,640

(22) Filed: Jan. 16, 2011

(65) Prior Publication Data

US 2012/0181397 A1    Jul. 19, 2012

(51) Int. Cl.
  *A47F 7/00*      (2006.01)
  *F16B 2/24*      (2006.01)
  *B62H 3/12*      (2006.01)
  *F16B 45/00*     (2006.01)

(52) U.S. Cl.
  CPC  *B62H 3/12* (2013.01); *F16B 2/246* (2013.01); *F16B 45/00* (2013.01)
  USPC ........ 211/18; 211/107; 248/227.3; 248/230.4

(58) Field of Classification Search
  USPC ............... 211/17, 18, 22, 107; 248/246, 410, 248/227.1, 227.3, 226.11, 227.4, 230.4, 248/125.1–125.3, 125.1–125.3; 403/109.5, 403/373, 104, 105; 182/136
  See application file for complete search history.

(56) References Cited

U.S. PATENT DOCUMENTS

| | | | | |
|---|---|---|---|---|
| 326,695 | A | * | 9/1885 | Wardwell ...................... 474/117 |
| 1,441,806 | A | * | 1/1923 | Hoitsma ....................... 182/136 |
| 1,975,303 | A | * | 10/1934 | Walker et al. ............... 248/125.1 |
| 2,861,765 | A | * | 11/1958 | Kolb ............................ 248/218.4 |
| 3,395,692 | A | * | 8/1968 | Johns .............................. 126/30 |
| 3,473,774 | A | * | 10/1969 | Riblet ............................ 248/246 |
| 3,734,441 | A | * | 5/1973 | Lux ............................. 248/354.1 |
| 3,787,015 | A | * | 1/1974 | Ablett ........................... 248/539 |
| 4,103,856 | A | * | 8/1978 | Riblet ............................ 248/246 |
| 6,494,327 | B2 | * | 12/2002 | Huang ........................... 211/17 |
| 6,725,971 | B1 | * | 4/2004 | Bair ............................. 182/186.6 |
| 8,047,492 | B2 | * | 11/2011 | Wang ............................. 248/307 |
| 2002/0125388 | A1 | * | 9/2002 | Eslick ......................... 248/230.4 |

* cited by examiner

Primary Examiner — Korie H Chan

(57) ABSTRACT

A display assembly includes a post, a first shackle provided around the post, a second shackle provided around the post, and a suspension unit pivotally connected to the second shackle. The second shackle is elastically connected to the first shackle so that the first and second shackles are normally pivoted from each other and hence abutted against the post to position the first and second shackles on the post.

12 Claims, 9 Drawing Sheets

APPARATUS FOR DISPLAYING A BICYCLE ON A POST

BACKGROUND OF INVENTION

1. Field of Invention

The present invention relates to a bicycle and, more particularly, to an apparatus displaying a bicycle on a post.

2. Related Prior Art

Disclosed in Taiwanese Patent No. 341086 is a conventional display assembly for a bicycle. The conventional display assembly includes a foot 10, a post and a suspension unit 2. The post includes a lower tube 11 connected to the foot 10 and an upper tube 12 connected to the lower tube 11. The suspension unit 2 includes a claw 20, a beam 21 connected to the claw 20, a crossbar 22 connected to the beam 21, and two forks 23 connected to the crossbar 22. The upper tube 12 is inserted in the claw 20. The claw 20 is secured to the upper tube 12 by welding. A bicycle can be displayed on the conventional apparatus, with the top tube thereof supported on the forks 23. The elevation of the suspension unit 2 and, therefore, the displayed bicycle cannot be changed, and this is inconvenient for displaying the bicycle to potential customers of different heights.

The present invention is therefore intended to obviate or at least alleviate the problems encountered in prior art.

SUMMARY OF INVENTION

It is the primary objective of the present invention to provide an apparatus for displaying a bicycle on a post at various elevations.

To achieve the foregoing objective, the apparatus includes a first shackle provided around the post, a second shackle provided around the post, and a suspension unit pivotally connected to the second shackle. The second shackle is elastically connected to the first shackle so that the first and second shackles are normally pivoted from each other and hence abutted against the post to position the first and second shackles on the post.

Other objectives, advantages and features of the present invention will be apparent from the following description referring to the attached drawings.

BRIEF DESCRIPTION OF DRAWINGS

The present invention will be described via detailed illustration of the preferred embodiment referring to the drawings wherein.

DETAILED DESCRIPTION OF PREFERRED EMBODIMENT

Figure 1:
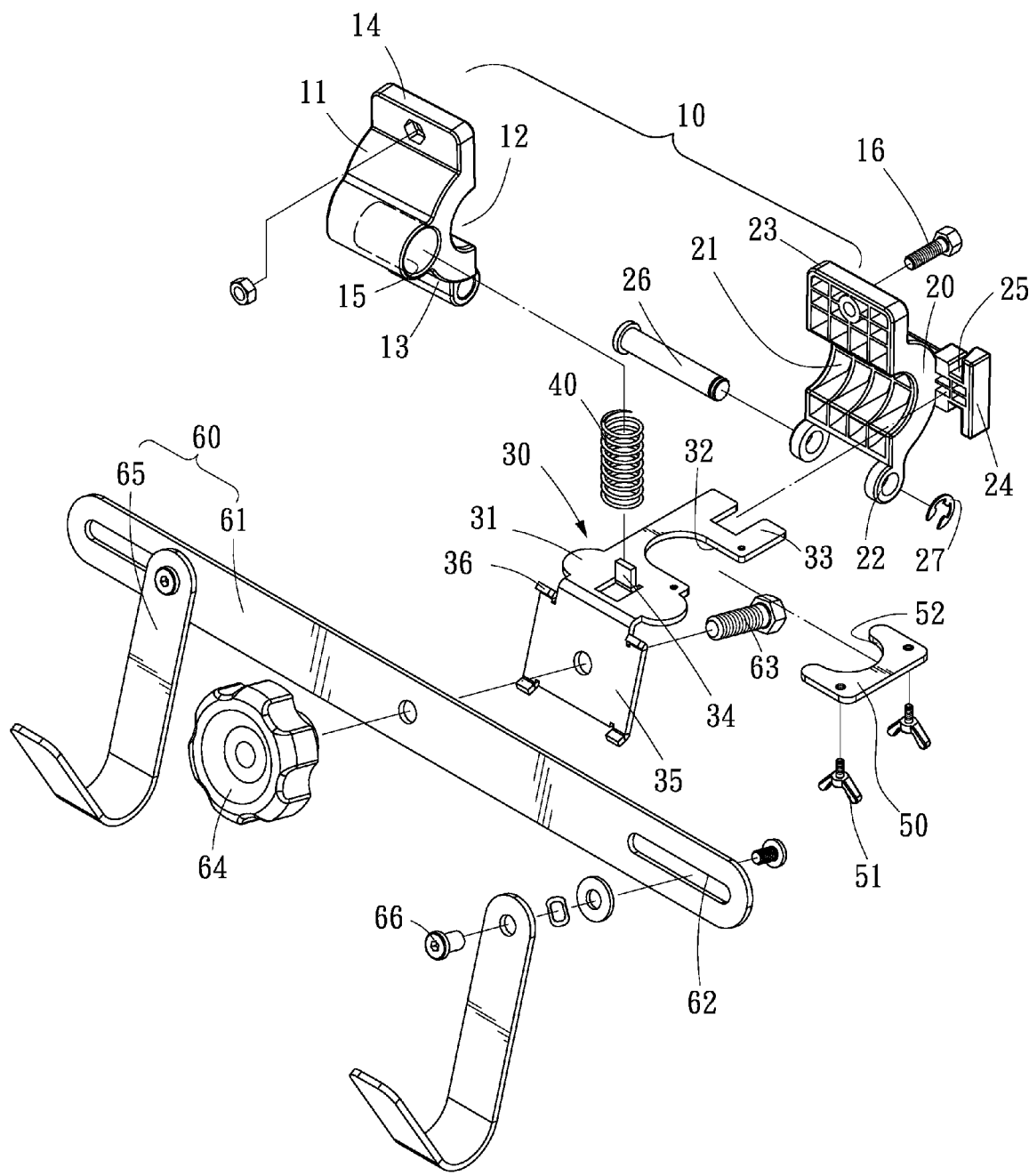
FIG. 1 is an exploded view of an apparatus for displaying a bicycle on a post according to the preferred embodiment of the present invention.
Figure 2:
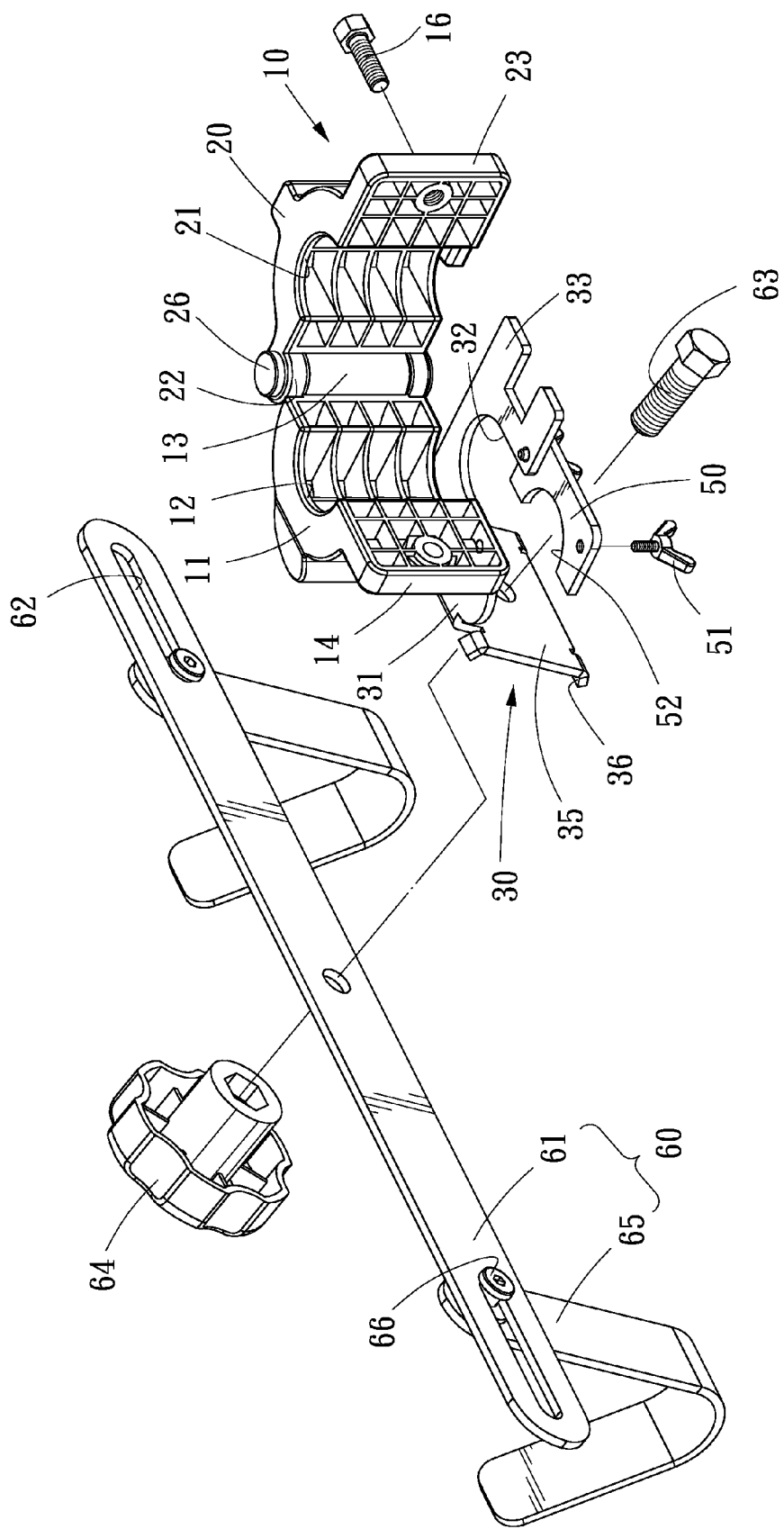
FIG. 2 is another exploded view of the apparatus shown in FIG. 1.

Referring to FIGS. 1 and 2, an apparatus for displaying a bicycle on a post includes a first shackle 10, a second shackle 30, a spring 40 and a suspension unit 60 according to the preferred embodiment of the present invention. The first shackle 10 includes two arched elements 11 and 20. The arched element 11 includes a groove 12 defined in a concave face, a cap 15 formed on a convex face opposite to the concave face, a tubular portion 13 formed along an edge, and a fin 14 formed along an opposite edge. The length of the groove 12 is parallel to the axis of the cavity defined in the cap 15.

The arched element 20 includes a groove 21 defined in a concave face, an anchor 24 formed on a convex face opposite to the concave face, two annular portions 22 formed at an edge, and a fin 23 formed along an opposite edge. The length of the groove 12 is parallel to the length of the anchor 24. The anchor 24 includes two recesses 25 each defined in a related one of two opposite sides.

In assembly, the tubular portion 13 is located between the annular portions 22 before a pin 26 is inserted through the annular portions 22 and the tubular portion 13. A C-clip 27 is engaged with the pin 26. Thus, the arched elements 11 and 20 are connected to each other pivotally.

The second shackle 30 includes plates 31 and 50. The plate 31 includes a cutout 32 defined therein, two coplanar fins 33 extending from an edge, an inclined fin 35 extending from an opposite edge, and a tab 34 extending from an upper face. There is a gap between the coplanar fins 33. The inclined fin 35 extends at an angle relative to the coplanar fins 33. Four stops 36 extend from the inclined fin 35. The plate 50 includes a cutout 52 defined therein.

The suspension unit 60 includes a lever 61 and two hooks 65 connected to the lever 61. The lever 61 includes two slots 62 defined therein, each located near a related one of two opposite ends. A fastener 66 is used to connect each of the hooks 65 to the lever 61. Each of the fasteners 66 includes a nut engaged with a screw after the screw is inserted through a related one of the slots 62 and an aperture defined in a related one of the hooks 65. Thus, the hooks 65 are connected to the lever 62. The position of each of the hooks 65 on the lever 62 is changeable because of a related one of the slots 62.

Figure 3:
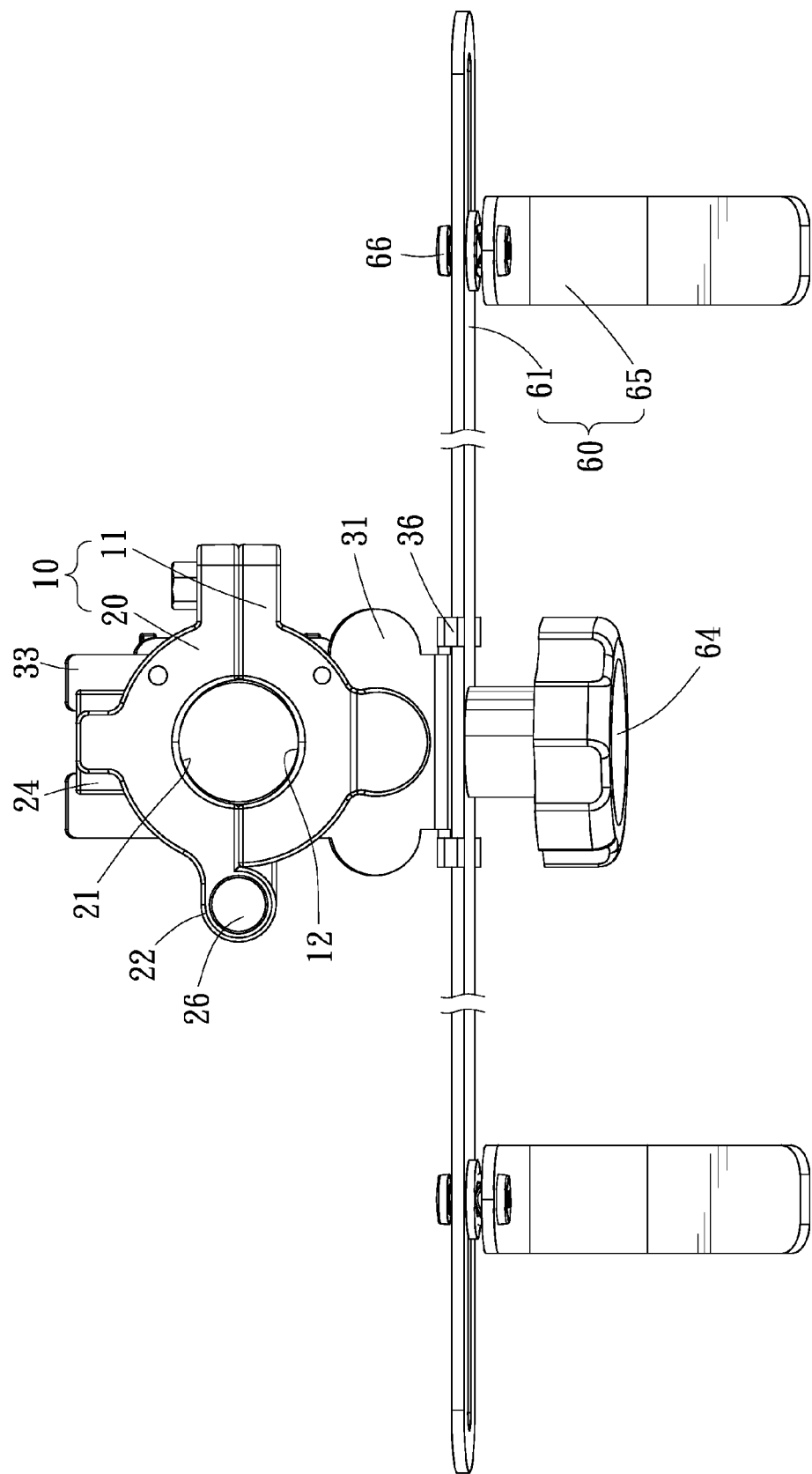
FIG. 3 is a top view of the apparatus shown in FIG. 1.
Figure 4:
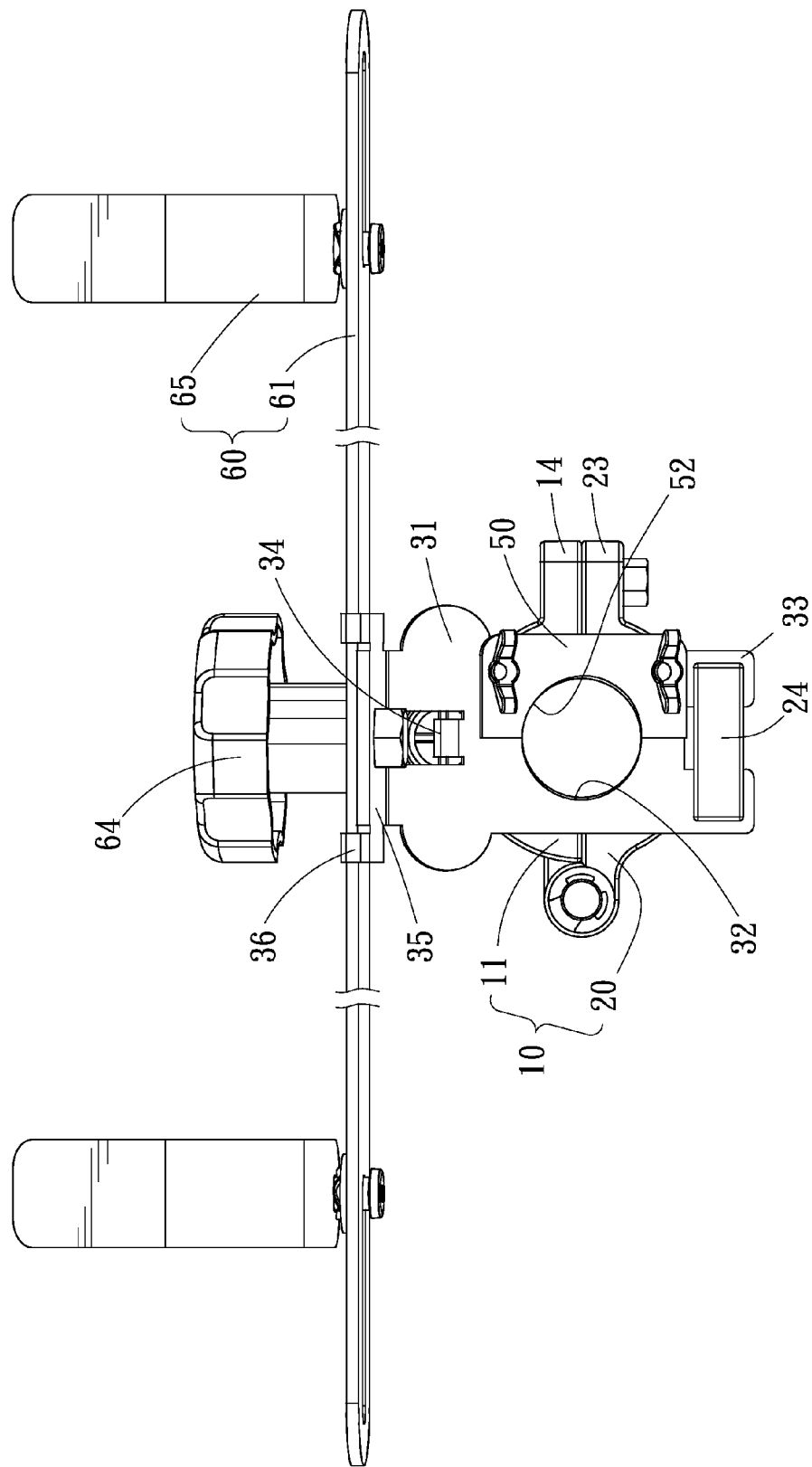
FIG. 4 is a bottom view of the apparatus shown in FIG. 1.
Figure 5:
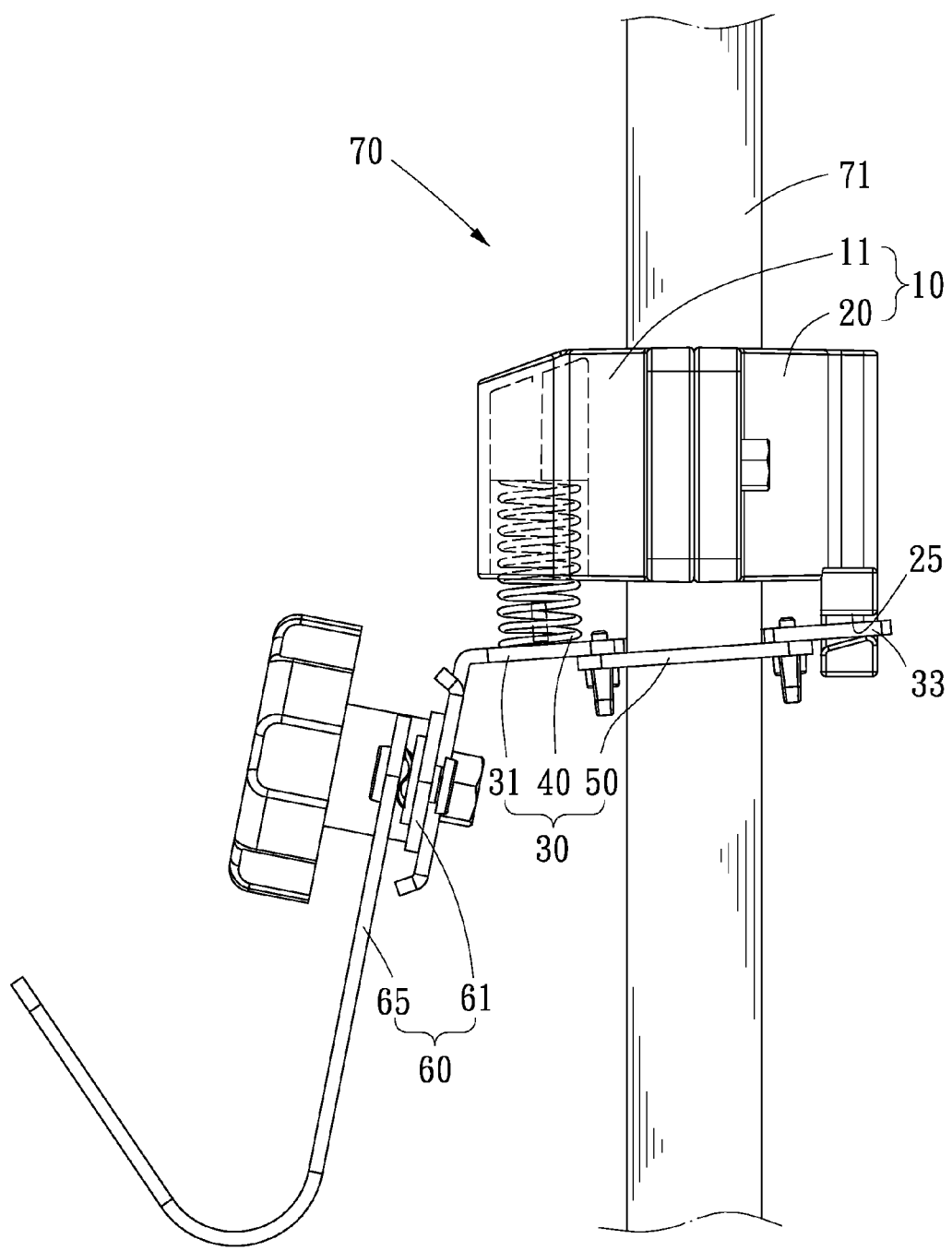
FIG. 5 is a right side view of the apparatus shown in FIG. 1.

Referring to FIGS. 3 and 4, a screw 63 is engaged with a nut embedded in a knob 64 after it is inserted through an aperture defined in the inclined fin 35 and an aperture defined in the lever 61. Thus, the lever 61 is pivotally connected to the inclined fin 35.

Referring to FIGS. 3 through 6, a solid post 71 or a hollow post 81 is located between the arched elements 11 and 20 of the first shackle 10. A screw 16 is engaged with a nut after it is inserted through apertures defined in the fins 14 and 23, respectively. Thus, the post 71 or 81 is inserted through a cylindrical tunnel defined between the arched elements 11 and 20 of the first shackle 10, i.e., a combination of the grooves 12 and 21.

An end of the spring 40 is located in the cap 15. The coplanar fins 33 are inserted through the recesses 25. The tab 34 is located in an opposite end of the spring 40. Thus, the spring 40 is compressed between the arched member 11 and the plate 31. The post 71 or 81 is inserted though the cutout 32. The plate 50 is overlapped with the plate 31. The post 71 or 81 is inserted through the cutout 52. Two screws 51 are driven in two screw holes defined in the plate 31 through two apertures defined in the plate 50. Thus, the post 71 or 81 is inserted through a circular aperture defined by the plates 31 and 50.

Figure 6:
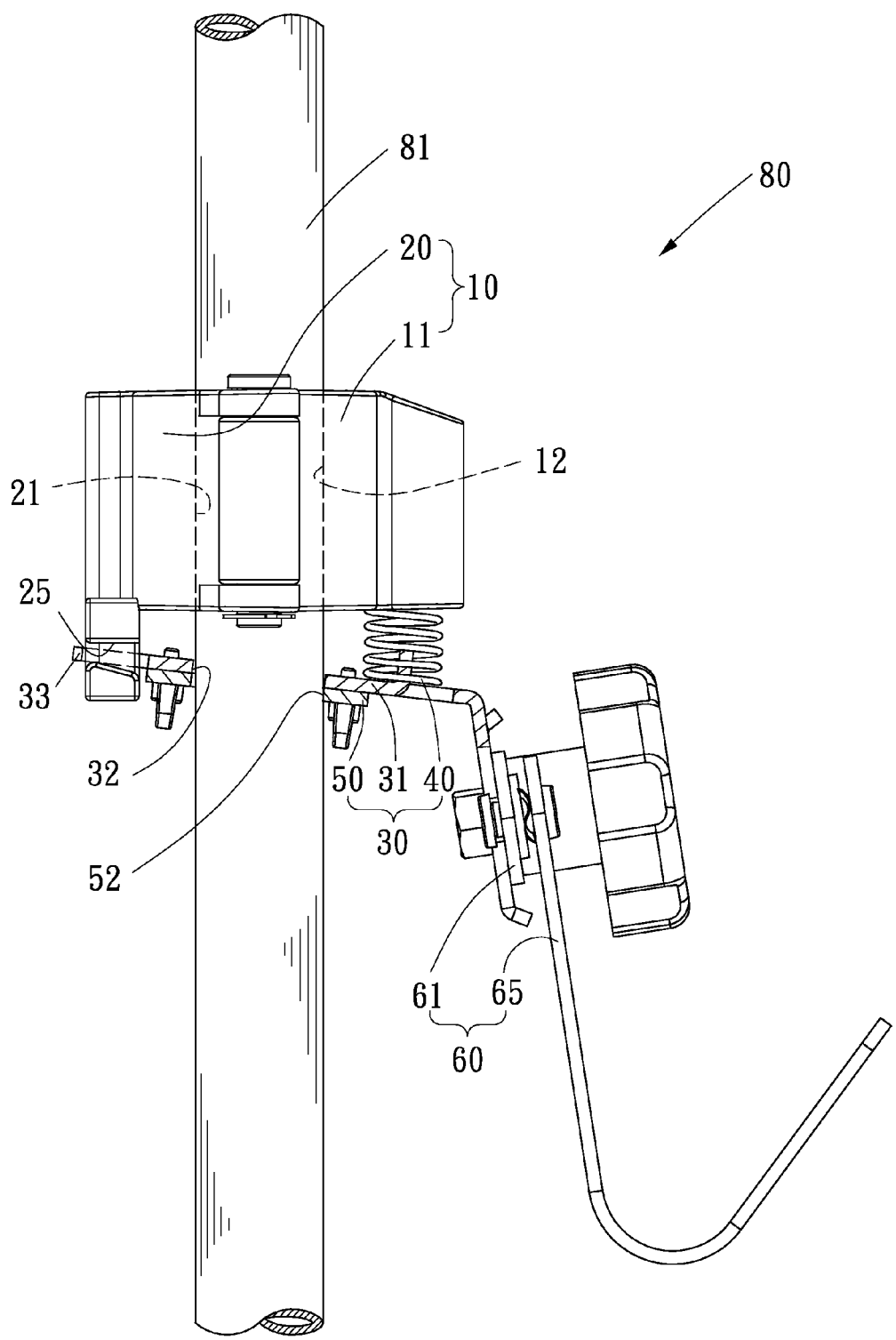
FIG. 6 is a left side view of the apparatus shown in FIG. 1.

Referring to FIG. 6, the spring 40 is compressed between the arched member 11 and the plate 31 as discussed above. Thus, the first shackle 10 and the second shackle 30 are pivoted away from each other by the spring 40. Hence, the first shackle 10 and the second shackle 30 are abutted against the post 71 or 81. Consequently, the apparatus is positioned on the post 71 or 81. The solid post 71 and the apparatus form a display assembly 70. The hollow post 81 and the apparatus form a display assembly 80.

Figure 7:
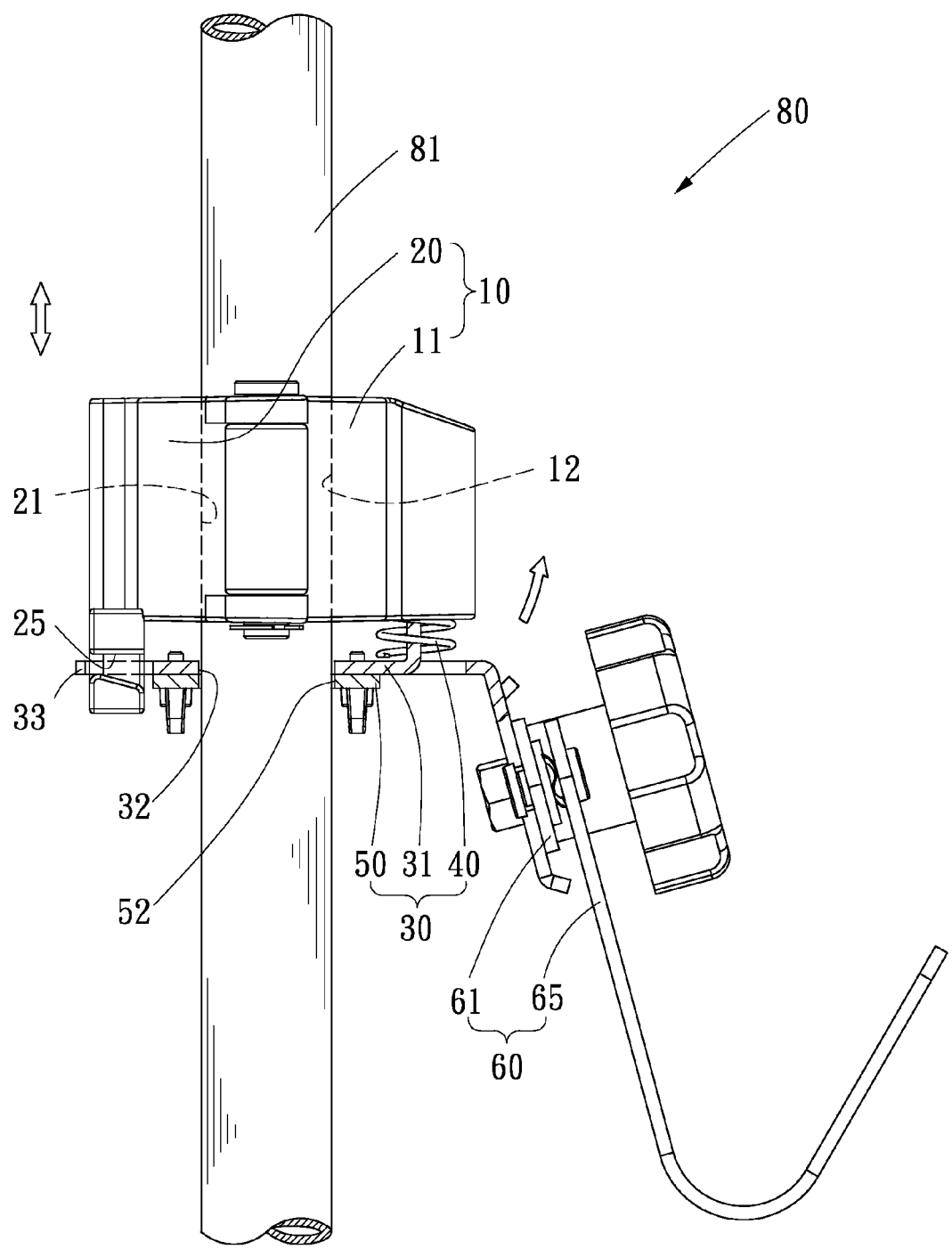
FIG. 7 is a left side view of the apparatus in another position than the position shown in FIG. 6.

Referring to FIG. 7, the first shackle 10 and the second shackle 30 are pivoted toward each other. Hence, the post 71 or 81 is not abutted against the first shackle 10 and the second shackle 30. As a result, the apparatus is movable along the post 71 or 81. That is, the elevation of the apparatus is changeable on the post 71 or 81.

Figure 8:
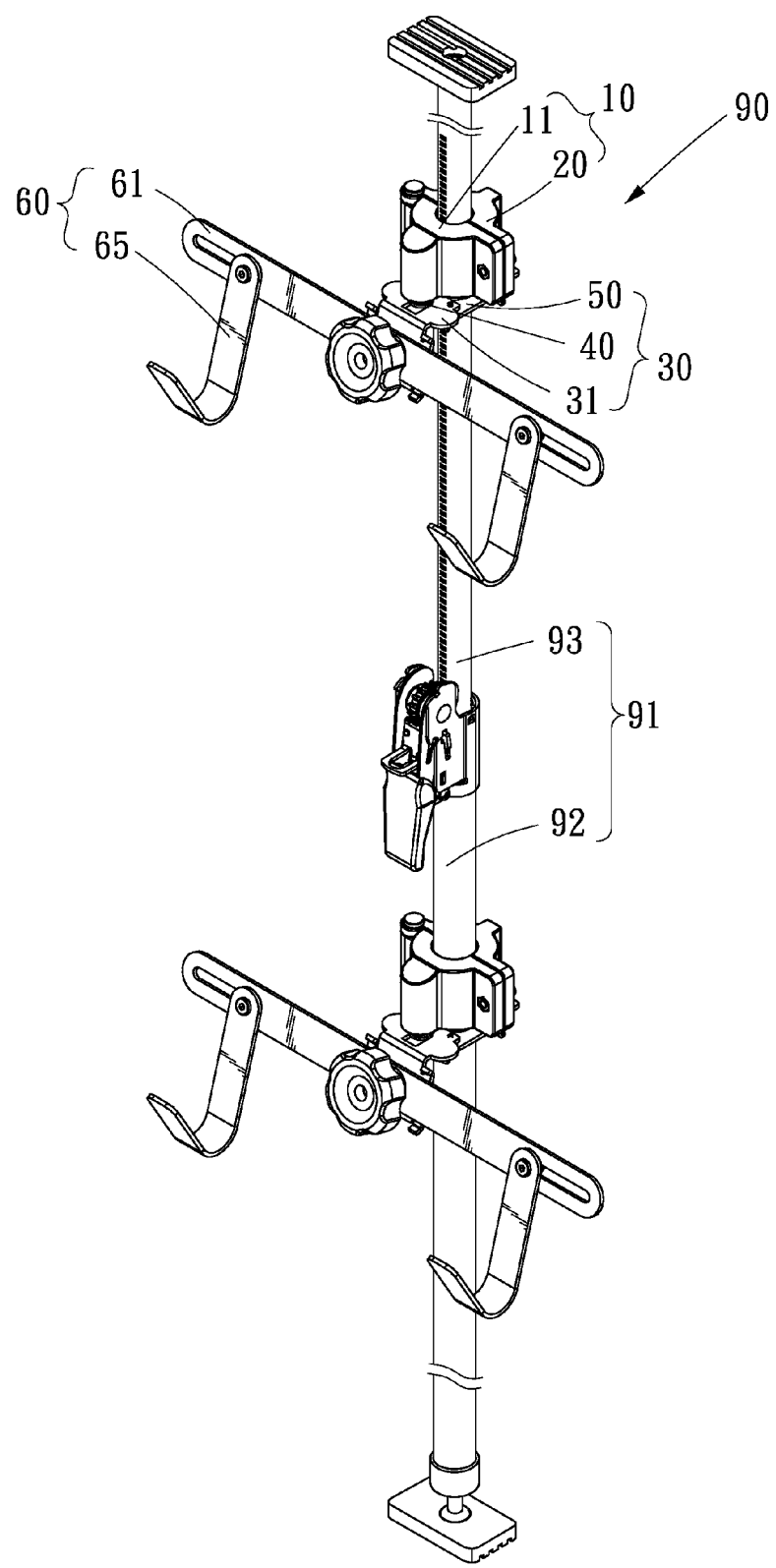
FIG. 8 is a perspective view of a telescopic post and two apparatuses as the one shown apparatus shown in FIG. 1.
Figure 9:
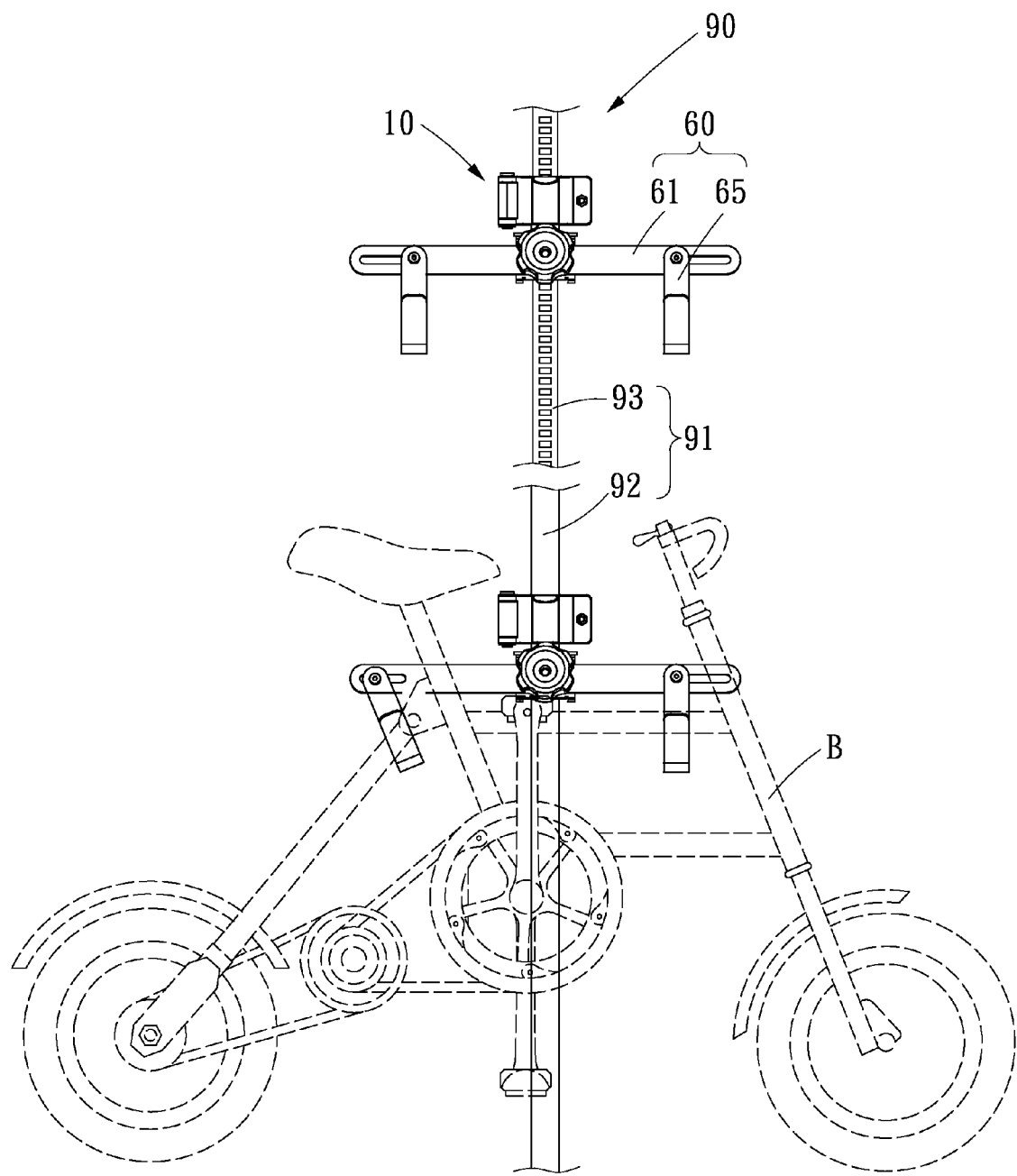
FIG. 9 is a front view of the apparatuses for supporting two bicycles on the telescopic post shown in FIG. 8.

Referring to FIGS. 8 and 9, shown is a display assembly 90 including a telescopic post 91 and two apparatuses as the one shown in FIGS. 1 to 7. The telescopic post 91 includes a lower tube 92, an upper tube 93 telescopically inserted in the lower tube 92, and a lock for positioning the lower tube 92 relative to the upper tube 93. One of the apparatuses is connected to the lower tube 92 while the other apparatus is connected to the upper tube 93. The top tube of a bicycle B can be hooked by the hooks 65 of a selected one of the apparatuses. Thus, the bicycle B is displayed on the telescopic post 91 by the selected apparatus.

The apparatus of the present invention exhibits several advantages. At first, a bicycle can easily be displayed on a post by the apparatus. Secondly, the apparatus is automatically positioned on a post by the spring 40, which biases the first shackle 10 and the second shackle 20 to abut against the post. Thirdly, the weight of a bicycle displayed on a post by the apparatus actually contributes to the positioning of the apparatus and the bicycle on the post. The weight of the suspension unit 60 and that of the second shackle 30 also contribute to the positioning of the apparatus and the bicycle on the post.

The present invention has been described via the detailed illustration of the preferred embodiment. Those skilled in the art can derive variations from the preferred embodiment without departing from the scope of the present invention. Therefore, the preferred embodiment shall not limit the scope of the present invention defined in the claims.

The invention claimed is:

1. A display assembly including:
    a post;
    a first shackle located around the post and formed with an anchor that includes two recesses;
    a second shackle located around the post and formed with two fins each inserted through a related one of the recesses so that the first and second shackles are normally pivoted from each other and hence abutted against the post to position the first and second shackles on the post;
    a spring compressed between the first and second shackles; and
    a suspension unit pivotally connected to the second shackle.

2. The display assembly according to claim 1, wherein the first shackle includes a cap for receiving an end of the spring, wherein the second shackle includes a tab inserted in an opposite end of the spring.

3. The display assembly according to claim 1, wherein the first shackle includes first and second arched elements pivotally connected to each other.

4. The display assembly according to claim 3, including a pin for pivotally connecting the first and second arched elements to each other.

5. The display assembly according to claim 4, wherein the second arched element includes two annular portions formed thereon, wherein the first arched element includes a tubular portion located between the annular portions, wherein the pin is inserted in the tubular portion and the annular portions.

6. The display assembly according to claim 1, wherein the second shackle includes:
    a primary plate including a cutout for receiving the post; and
    a secondary plate including a cutout for receiving the post, wherein the primary and secondary plates are overlapped with each other.

7. The display assembly according to claim 6, including two screws driven in the primary and secondary plates.

8. The display assembly according to claim 6, wherein the primary plate includes an inclined fin extending from an edge, wherein the suspension unit is pivotally connected to the inclined fin.

9. The display assembly according to claim 8, wherein the inclined fin includes four stops formed thereon for restraining the pivotal of the suspension unit on the inclined fin.

10. The display assembly according to claim 1, wherein the suspension unit includes a lever pivotally connected to the second shackle and two hooks movably connected to the lever.

11. The display assembly according to claim 10, including two fasteners each for connecting a related one of the hooks to the lever.

12. The display assembly according to claim 11, wherein the lever includes two slots defined therein, wherein each of the fasteners is inserted through a related one of the slots and a related one of the hooks.

* * * * *